United States Patent

Olowinski

[15] 3,706,465
[45] Dec. 19, 1972

[54] ELASTOMERIC REFLEX JOINT
[72] Inventor: Edward J. Olowinski, Erie, Pa.
[73] Assignee: Lord Corporation, Erie, Pa.
[22] Filed: Sept. 30, 1971
[21] Appl. No.: 185,019

[52] U.S. Cl. .................287/85 R, 287/130, 3/2, 128/83.5, 128/583
[51] Int. Cl. ............................F16b 7/00, A61f 1/04
[58] Field of Search.............3/1, 2, 7, 29, 30, 32–35, 3/22; 128/83.5, 583; 287/85 R, 130; 64/11 R

[56] References Cited

UNITED STATES PATENTS

| | | | |
|---|---|---|---|
| 1,001,641 | 8/1911 | Harrison | 3/32 |
| 2,264,570 | 12/1941 | Holden | 128/83.5 |
| 3,481,332 | 12/1969 | Arnold | 128/83.5 |

*Primary Examiner*—Richard A. Gaudet
*Assistant Examiner*—Ronald L. Frinks
*Attorney*—James W. Wright

[57] ABSTRACT

Spaced members have opposed spaced apart load-carrying surfaces. A plurality of elongate elastomeric bodies are symmetrically disposed between the surfaces in spaced apart relation about a pivot axis in axial compression load-carrying relation. Vane means carried by the spaced members are resiliently maintained or biased in engaging relation with the periphery of the elastomeric bodies. Upon axial compression of the elastomeric odies, their circumference expands. The vane means are responsiv to this circumferential expansion for causing relative rotation between the spaced members about the pivot axis.

10 Claims, 6 Drawing Figures

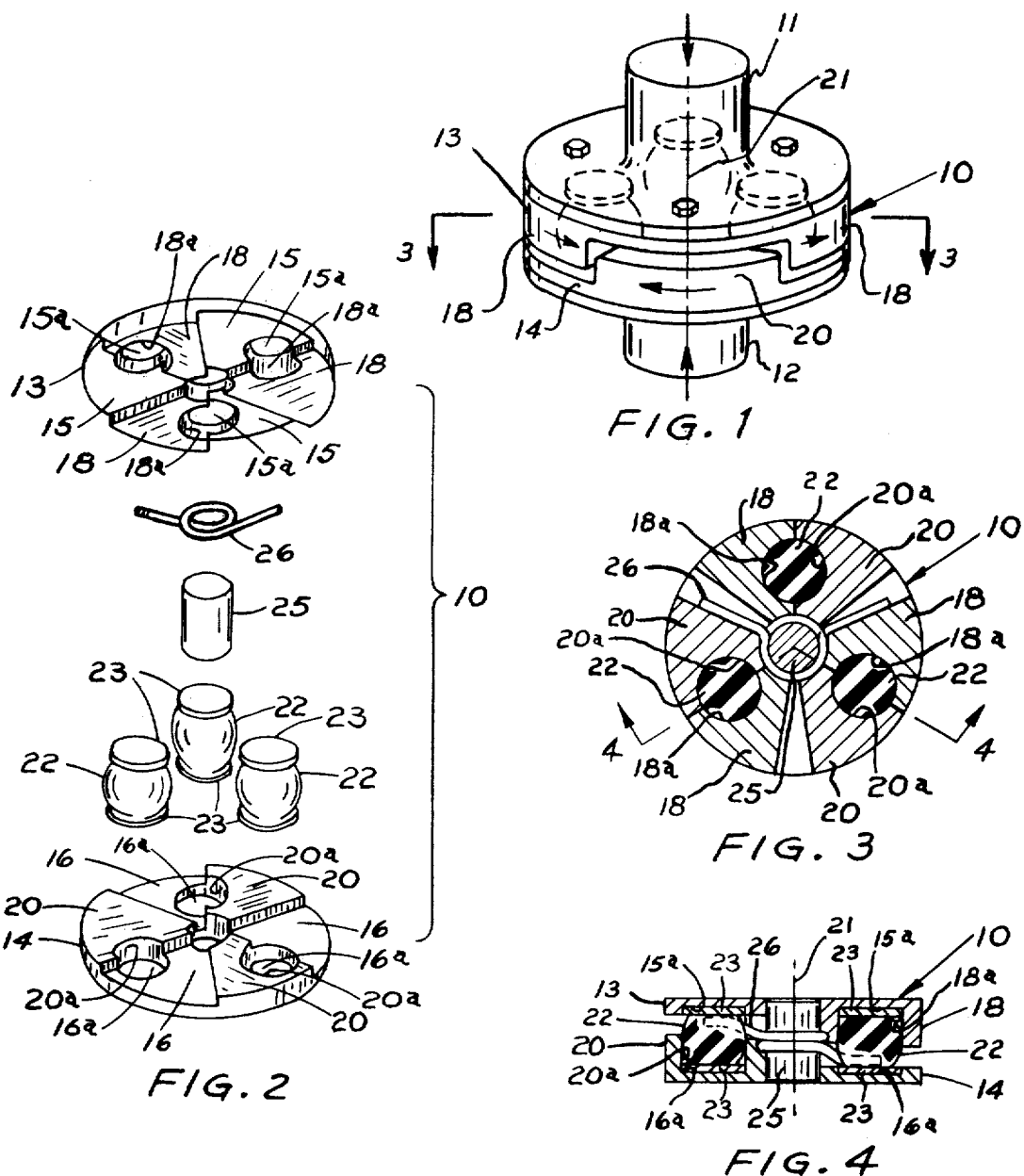
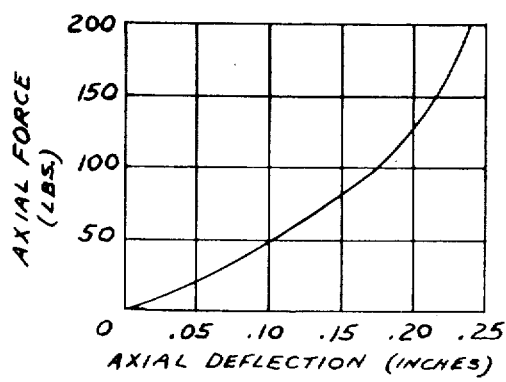
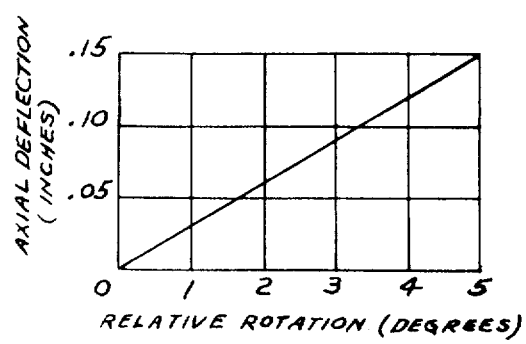

ELASTOMERIC REFLEX JOINT

This invention relates to an elastomeric joint and more particularily to an elastomeric reflex joint which when loaded axially in compression positively causes relative rotation between opposite ends of the joint and which when unloaded automatically returns to its original unloaded position, both axially and rotationally.

While such a reflex joint has many applications, a particular application which led to the development of this invention is as a torsion compensator joint for the artificial leg of an amputee. During the walking or otherwise application of weight by the amputee to an artificial leg there is a torsional or twisting strain established about the longitudinal axis of the leg between the natural and artificial leg portions which if not accommodated or compensated for can cause severe discomfort to the amputee. While accommodation of this strain will tend to minimize the discomfort, compensation which will completely eliminate the strain is preferred.

With the above in mind, it is an object of the present invention to provide an elastomeric reflex joint which in response to an axial compressive load positively causes relative rotation about the compression axis between opposite ends of the joint. Another object of this invention is to provide such a joint which when unloaded positively returns to its original unloaded position to provide for repeatable operation of the joint.

A further object of the present invention is to provide an elastomeric reflex joint for an artificial leg of an amputee which compensates for torsional strains between the natural and artificial leg portions.

A still further object of the present invention is to provide an elastomeric reflex joint which relies on the the circumferential expansion of elastomeric bodies upon the application of an axial compressive load to cause positive relative rotation between opposite ends of the joint.

Briefly, the objects of the present invention are accomplished in an elastomeric reflex joint including spaced members having opposed spaced apart load-carrying surfaces. A plurality of elongate elastomeric bodies are symmetrically disposed in spaced apart relation about a pivot axis in axial compression load-carrying relation between the load-carrying surfaces of the spaced members. The bodies are substantially identical and under an axial compressive load between the spaced members are compressed to resiliently deflect axially while expanding circumferentially. Vane means are fixedly carried by at least one, preferably both, of the spaced members between their load-carrying surfaces and are resiliently biased in engaging relation with the periphery of the elastomeric bodies and cooperate therewith such that they are responsive to the circumferential expanding of the elastomeric bodies for causing relative rotation between the spaced members about the pivot axis.

Some of the objects of the invention having been stated, other objects will appear as the description proceeds, when taken in connection with the accompanying drawings, in which:

FIG. 1 is a perspective view of an elastomeric reflex joint of the present invention;

FIG. 2 is a reduced and exploded view of the elastomeric reflex joint of FIG. 1;

FIG. 3 is a reduced sectional view taken substantially along the line 3—3 of FIG. 1;

FIG. 4 is a sectional view taken substantially along the line 4—4 of FIG. 3; and FIGS. 5 and 6 are graphic illustrations of the force-deflection and rotation characteristics of an elastomeric reflex joint of the present invention.

With reference now to the various figures wherein like reference characters as used to indicate like parts there is shown in FIG. 1, an elastomeric reflex joint, generally indicated at 10, of the present invention mounted between spaced apart load transmitting members 11 and 12. The geometry of the joint 10 is substantially cylindrical and of low profile with remote planar and parallel ends to which may be readily attached load transmitting members 11 and 12.

The elastomeric reflex joint 10, as perhaps best illustrated in FIG. 2, comprises coaxially disposed circular spaced members 13 and 14 which have opposed spaced apart planar load-carrying surfaces 15 and 16, respectively. A plurality of three spaced, generally pie shaped, vanes 18 and 20 are symmetrically arranged about a pivot axis 21 defined by and passing through the coaxial centers of the circular spaced members 13 and 14. The vanes 18 and 20 are fixedly carried by the spaced members 13 and 14, respectively, but in staggered relation, FIG. 2. In the present embodiment, the vanes 18 and 20 are shown as integral with the spaced members 13 and 14, respectively. However, the vanes 18 and 20 may be discrete and otherwise fixedly secured to the spaced members 13 and 14. Geometry other than pie shaped may also be employed. With the spaced members 13 and 14 disposed in overlying relation, the staggered and spaced relation of the vanes 18 and 20 allows them to be nestled together, FIGS. 1 and 3. In addition, it should be noted that the vanes 18 and 20 are sufficiently small to allow for limited relative rotation of the spaced members 13 and 14 about the pivot axis 21 while in the nestled position prior to interference or being snubbed against each other.

A plurality of three semi-circular recesses 18a and 20a are formed in common edges of the pie shaped vanes 18 and 20, respectively, which mate or register with circular recesses 15a and 16a in the load carrying surfaces 15 and 16 of the spaced members 13 and 14, respectively. From FIGS. 2 and 3, it will be seen that the semi-circular recesses 18a and 20a in vanes 18 and 20 are in opposite common edges. With the spaced members 13 and 14 nestled together and adjacent edges having the recesses abutting, FIG. 3, the semi-circular recesses 18a and 20a of vanes 18 and 20 and circular recesses 15a and 16a of the spaced members 13 and 14 mate and register to define cylindrical shaped cavities symmetrically disposed about the pivot axis 21.

A plurality of three elongate elastomeric bodies 22 are disposed in the cylindrical cavities in axial compressive load-carrying relation between the load-carrying surface 15 and 16 of the spaced members 13 and 14 parallel to the pivot axis 21. The elastomeric bodies 22 have circular planar plates 23 of a diameter substantially equal to but slightly less than the diameter of the cylindrical cavities bonded to opposite ends thereof. The plates 23 are received in the aligned circular recesses 15a and 16a in the load-carrying surfaces 15 and 16 of the spaced members 13 and 14. These plates 23 insure uniform axial loading of the elastomeric bodies 22, maintains their symmetric locations and prevents movement of the ends of the elastomeric bodies 22 relative to the adjacent member 13 and 14 during relative rotation. Also, this interconnection allows for easy removal and replacement of the elastomeric bodies 22.

The elastomeric bodies 22 may take on many configurations depending on the characteristics desired of the joint. However, it is advantageous for the elastomeric bodies 22 to have a substantially circular cross sectional area transverse to their longitudinal axis to provide a large peripherical uniform engaging surface. In the present embodiment the elastomeric bodies 22 are solid and substantially spherical. The spherical configuration has been chosen because of its non-uniform spring rate characteristics, FIG. 5, and its exceptionally long fatigue characteristics.

As is well known, except for a few instances and always for a solid elastomeric body, upon the application of an axial compressive load, the body is compressed to deflect axially while expanding circumferential. This invention relies on this circumferential expansion to provide relative rotation. With reference to FIG. 3, the edges of vanes 18 and 20 are resiliently biased in conforming engagement with the periphery of the elastomeric bodies 22. Thus, upon axial compressive loading of the elastomeric bodies 22 such as shown in FIG. 1, the circumference of the elastomeric bodies 22 expand and cause the vanes 18 and 20 and spaced members 13 and 14 to be rotated relative to each other about the pivot axis 21 as indicated by the arrows. During this relative rotation the elastomeric bodies 22 will be deflected in shear which will resiliently bias the spaced members 13 and 14 toward their original unloaded position. Accordingly, upon removal of the axial load the members 13 and 14 will return to their original position to allow repeatable operation of the joint 10.

The symmetry of the joint 10 provides uniform axial deflection and relative rotation between the spaced member 13 and 14 about the pivot axis 21. To further insure the relative rotation about the pivot axis 21 an elongate pivot pin 25 may be used to interconnect the spaced members 13 and 14, the elongate axis of which is coincident with the pivot axis 21. In addition to insuring relative rotation about the pivot axis 21, the pivot pin 25 will limit cocking or tilting between the spaced members 13 and 14 such as would be caused by the non-uniform and non-axial loading of the joint 10.

A torsion spring 26 or the like may be employed to further resiliently bias the spaced members 13 and 14 to an original position where the vanes 18 and 20 are in engaging relation with the respective elastomeric bodies 22. The torsion spring 26 is disposed about the pivot pin 25 between the supporting and supported members 13 and 14, FIGS. 3 and 4, and has remote ends radially extending from the pivot axis 21 and in abutting relation with a vane 18 and 20, respectively, to bias the spaced members 13 and 14 in opposite directions and opposite to the direction of relative rotation provided by the elastomeric bodies 22 upon the application of an axial load. Thus, the spaced members 13 and 14 are further resiliently biased to the original unloaded position to insure repeatable operation of the joint 10.

With reference to FIGS. 5 and 6 there is graphically illustrated the performance characteristics of a joint heretofore described. In view of the above description, the operation of the joint need not be explained in detail. It suffices to say that an axial compressive load on the joint 10 causes the elastomeric bodies 22 to be axially compressed. This axial compression results in a circumferential expansion or bulging of the elastomeric bodies 22. During this circumferential expansion, the vanes 18 and 20 are forced apart relative to each other providing a relative rotation between the spaced members 13 and 14 about the pivot axis 21.

The axial compressive force versus axial deflection characteristics of the joint is a function of the number, size, geometry and modulus of the elastomeric bodies. The axial translation versus rotation characteristics of the joint is a function of the axial deflection to bulge ratio of the elastomeric bodies and the geometric relation of the elastomeric bodies with the vanes. Accordingly, the desired characteristics of a joint of this invention may be provided by proper selection and control of the above mentioned parameters.

While the joint of the present invention has been described with relative rotation being provided responsive to an axial compression, it will be apparent that the joint also operates in the reverse manner.

In the drawings and specification, there has been set forth a preferred embodiment of the invention and, although specific terms are employed, they are used in a generic and descriptive sense only and not for purposes of limitation.

What is claimed is:

1. An elastomeric reflex joint comprising
   spaced members having opposed spaced apart load-carrying surfaces,
   a plurality of elongate elastomeric bodies symmetrically disposed in parallel spaced apart relation about a pivot axis in axial compressive load-carrying relation between said load-carrying surfaces, said bodies being substantially identical and under an axial compressive load resiliently deflecting axially and expanding circumferentially, and
   vane means fixedly carried by at least one of said spaced members between said load-carrying surfaces and resiliently biased toward engaging relation with the periphery of at least one of said elastomeric bodies, said vane means being responsive to the circumferential expanding of said elastomeric bodies for providing relative rotation between said spaced members about said pivot axis.

2. An elastomeric reflex joint comprising
   spaced members having opposed spaced apart load-carrying surfaces,
   a plurality of elongate elastomeric bodies symmetrically disposed in parallel spaced apart relation about a pivot axis in axial compressive load-carrying relation between said load-carrying surfaces with opposite ends thereof interconnected with said spaced members, respectively, to prevent relative movement therebetween transversely of said pivot axis, said bodies being substantially identical and under an axial compressive load resiliently deflecting axially and expanding circumferentially, and a plurality of vane means symmetrically disposed and fixedly carried by and between said spaced members and extending generally radially from said pivot axis between said elastomeric bodies, said vane means carried by one of said members being engaged by a common side of said elastomeric bodies and said vane means carried by the other of said members being engaged by the diametrically opposed side of said elastomeric bodies upon circumferential expansion of said elastomeric bodies and cooperating to provide relative rotation between said spaced members about said pivot axis.

3. An elastomeric reflex joint, according to claim 2, including separate spring means resiliently biasing said vane means toward engaging relation with said elastomeric bodies.

4. An elastomeric reflex joint, according to claim 3, wherein said spring means comprises a torsion spring including pivot means interconnecting said spaced members.

5. An elastomeric reflex joint, according to claim 2, including pivot means interconnecting said spaced members and defining said pivot axis.

6. An elastomeric reflex joint, according to claim 2, wherein said elastomeric bodies are solid and have a circular cross-sectional area transverse to said pivot axis.

7. An elastomeric reflex joint, according to claim 2, including plate means bonded to opposite ends of said elastomeric bodies, and wherein said spaced members have recesses disposed in said load-carrying surfaces in opposed relation to each other with said plate means received therein.

8. An elastomeric reflex joint, according to claim 7, wherein said elastomeric bodies are solid and substantially spherical.

9. An elastomeric reflex joint comprising spaced members having opposed spaced apart load-carrying surfaces a plurality of elongate solid elastomeric bodies symmetrically disposed in spaced apart relation about a pivot axis in axial compressive load-carrying relation between said load-carrying surfaces with opposite ends thereof interconnected with said spaced members, respectively, to prevent relative movement therebetween transversely of said pivot axis, said bodies being substantially identical and under an axial compressive load-resiliently deflecting axially and expanding circumferentially, and a plurality of vane means symmetrically disposed and fixedly carried by each of said spaced members, said means extending generally radially from said pivot axis between said elastomeric bodies and being staggered relative to each other in nesting relation while allowing limited relative rotation between said spaced members, adjacent edges of said vane means on opposite sides of said elastomeric bodies conforming generally to and normally engaging the periphery of said elastomeric bodies whereby said vane means will be responsive to the circumferential expanding of said elastomeric bodies for providing relative rotation between said spaced members about said pivot axis.

10. An elastomeric reflex joint comprising circular spaced members coaxially disposed in spaced apart relation and defining opposed planar load-carrying surfaces, said load-carrying surfaces having a plurality of opposed and aligned recesses symmetrically arranged about a pivot axis defined by the coaxial centers of said members, a plurality of substantially identical elongate solid elastomeric bodies having a circular cross sectional area transverse to their longitudinal axis, each of said elastomeric bodies being resiliently deflected axially under an axial compressive load while expanding circumferentially, a planar plate bonded to opposite ends of each of said elastomeric bodies, said elastomeric bodies being symmetrically disposed in spaced apart relation about said pivot axis in axial compressive load-carrying relation between said load-carrying surfaces with said plates received in said aligned recesses to interconnect said spaced members to opposite ends of said elastomeric bodies whereby relative movement therebetween transversely of said pivot axis is prevented, a plurality of vane means symmetrically disposed and fixedly carried by each of said spaced members, said vane means extending generally radially from said pivot axis between said elastomeric bodies and being staggered relative to each other in nesting relation while allowing limited relative rotation between said spaced members, adjacent edges of said vane means on opposite sides of said elastomeric bodies conforming generally to and normally engaging the periphery of said elastomeric bodies whereby said vane mean will be responsive to the circumferential expanding of said elastomeric bodies for providing relative rotation between said spaced members about said pivot axis.

* * * * *